United States Patent
Gunzelmann et al.

(10) Patent No.: US 12,531,335 B2
(45) Date of Patent: Jan. 20, 2026

(54) ELECTRONIC DEVICE WITH FULLY-CONNECTED PHOTONIC ANTENNA ARRAY

(71) Applicant: Apple Inc., Cupertino, CA (US)

(72) Inventors: Bertram R Gunzelmann, Koenigsbrunn (DE); Zdravko Boos, Munich (DE); Ramin Khayatzadeh, Munich (DE); Nedim Muharemovic, Nuremberg (DE)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 18/463,234

(22) Filed: Sep. 7, 2023

(65) Prior Publication Data

US 2024/0088556 A1    Mar. 14, 2024

Related U.S. Application Data

(60) Provisional application No. 63/406,643, filed on Sep. 14, 2022.

(51) Int. Cl.
  *H01Q 1/24* (2006.01)
  *H01Q 3/26* (2006.01)
  *H01Q 15/00* (2006.01)

(52) U.S. Cl.
  CPC ....... *H01Q 3/2676* (2013.01); *H01Q 15/0033* (2013.01)

(58) Field of Classification Search
  CPC ............. H01Q 3/2676; H01Q 15/0033; H01Q 1/2258; H01Q 1/241; H01Q 1/242
  See application file for complete search history.

(56) References Cited

U.S. PATENT DOCUMENTS

| 11,146,351 | B1* | 10/2021 | Xu | H04Q 11/0005 |
| 2003/0118280 | A1* | 6/2003 | Miyazaki | H04B 10/25758 |
| | | | | 385/24 |

(Continued)

FOREIGN PATENT DOCUMENTS

| CN | 101253711 | * | 8/2008 | |
| WO | WO-2008033225 A2 | * | 3/2008 | E21B 29/06 |

OTHER PUBLICATIONS

Yuki Matsuo et al., THz-Wave Power Multiplication by Parallel-Connection UTC-PDs, 2020 Opto-Electronics and Communications Conference (OECC), Dec. 2020, IEEE, New York, NY, United States.

(Continued)

*Primary Examiner* — Awat M Salih
(74) *Attorney, Agent, or Firm* — Treyz Law Group, P.C.; Michael H. Lyons

(57) ABSTRACT

An electronic device may include a fully-connected photonic phased antenna array having a set of antennas, each with an antenna resonating element coupled to a set of photodiodes. Optical modulators may receive different wireless data streams and may generate modulated signals. Optical paths may provide the modulated signals generated by each modulator to a different photodiode in each antenna. Sets of optical phase shifters may apply different sets of phase shifts for each of the modulated signals. Optical paths may provide the phase shifted signals to the photodiodes in the antennas. The photodiodes may produce currents that are superposed on the antenna resonating elements. Each antenna may be used to concurrently convey all of the wireless data streams. The phase shifts may configure the array to transmit signals that include the wireless data streams within different respective signal beams.

20 Claims, 7 Drawing Sheets

(56) References Cited

U.S. PATENT DOCUMENTS

| | | | |
|---|---|---|---|
| 2006/0067709 A1* | 3/2006 | Newberg | H01Q 3/2676 398/188 |
| 2008/0063028 A1* | 3/2008 | Lekkas | H04B 1/04 375/130 |
| 2013/0177319 A1* | 7/2013 | Middleton | H01Q 3/2676 398/115 |
| 2013/0202308 A1* | 8/2013 | Middleton | H01Q 3/2676 29/601 |
| 2013/0249771 A1* | 9/2013 | Kotter | H01Q 1/248 29/601 |
| 2015/0326322 A1* | 11/2015 | Ben-Bassat | H01Q 1/248 29/601 |
| 2017/0244165 A1* | 8/2017 | Ghelfi | H01Q 3/2676 |
| 2020/0076511 A1* | 3/2020 | Lim | H04B 10/6162 |
| 2023/0057449 A1 | 2/2023 | Boos et al. | |
| 2024/0120998 A1* | 4/2024 | Su | H04B 10/25752 |

OTHER PUBLICATIONS

Giovanni Serafino et al., Simultaneous Beam Steering of Multiple Signals Based on Optical Wavelength Selective Switch, Proceedings of the 11th European Radar Conference, Oct. 2014, IEEE, New York, NY, United States.

U.S. Appl. No. 18/184,555, filed Mar. 15, 2023.

U.S. Appl. No. 17/944,726, filed Sep. 14, 2022.

\* cited by examiner

ELECTRONIC DEVICE WITH FULLY-CONNECTED PHOTONIC ANTENNA ARRAY

This application claims the benefit of U.S. Provisional Patent Application No. 63/406,643, filed Sep. 14, 2022, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. In addition, it can be difficult to provide wireless circuitry that supports these frequencies with satisfactory levels of wireless performance.

SUMMARY

An electronic device may include wireless circuitry having a first optical local oscillator (LO) light source that generates a first optical LO signal and a second optical LO light source that generates a second optical LO signal. The wireless circuitry may have a fully-connected photonic phased antenna array. The phased antenna array may include a set of L antennas. Each antenna may have a respective antenna resonating element coupled to a respective set of photodiodes.

The wireless circuitry may include a set of K electro-optical modulators that receive K different wireless data streams. The electro-optical modulators may generate K modulated optical signals by modulating the second optical LO signal using the wireless data streams. Optical paths may provide the modulated optical signals generated by each electro-optical modulator to a different photodiode in each antenna. The wireless circuitry may include K sets of L optical phase shifters. Each set of optical phase shifters may apply a different set of optical phase shifts to the second optical LO signal for each of the K modulated optical signals, generating phase shifted signals. Optical paths may provide two or more phase shifted signals from each set of optical phase shifters to the photodiodes in each of the antennas. In a given antenna, the photodiodes may produce currents that are superposed on the corresponding antenna resonating element when illuminated by a phase shifted signals and the modulated optical signals. The currents may produce radio-frequency signals that are radiated by the antenna resonating elements.

In this way, each antenna may be used to concurrently convey all K wireless data streams. The sets of optical phase shifts may configure the phased antenna array to transmit radio-frequency signals that include all K wireless data streams within K different respective signal beams. The signal beams may be oriented in different directions or the same direction. The wireless data streams may include wireless communication data for receipt by an external device and/or radio-frequency sensing signals.

An aspect of the disclosure provides an electronic device. The electronic device can include an antenna resonating element. The electronic device can include a first photodiode coupled to the antenna resonating element. The electronic device can include a second photodiode coupled to the antenna resonating element. The electronic device can include a first electro-optical modulator optically coupled to the first photodiode. The electronic device can include a second electro-optical modulator optically coupled to the second photodiode.

An aspect of the disclosure provides an electronic device. The electronic device can include a first antenna resonating element. The electronic device can include a first photodiode coupled to the first antenna resonating element and configured to produce, based on a first optical signal, a first current on the first antenna resonating element. The electronic device can include a second photodiode coupled to the first antenna resonating element, wherein the second photodiode is configured to produce, based on a second optical signal, a second current on the first antenna resonating element concurrent with the first photodiode producing the first current on the first antenna resonating element, the first current being different from the second current.

An aspect of the disclosure provides an electronic device. The electronic device can include a phased antenna array having a set of antennas, each antenna in the set of antennas having a respective antenna resonating element coupled to a respective plurality of photodiodes. The electronic device can include a light source configured to generate an optical signal. The electronic device can include a first electro-optical modulator configured to modulate a first wireless data stream onto the optical signal to generate a first modulated optical signal. The electronic device can include a second electro-optical modulator configured to modulate a second wireless data stream onto the optical signal to generate a second modulated optical signal. The electronic device can include optical paths configured to provide the first modulated optical signal to a first photodiode in each of the antennas in the set of antennas and configured to provide the second modulated optical signal to a second photodiode in each of the antennas in the set of antennas.

DETAILED DESCRIPTION

Figure 1:
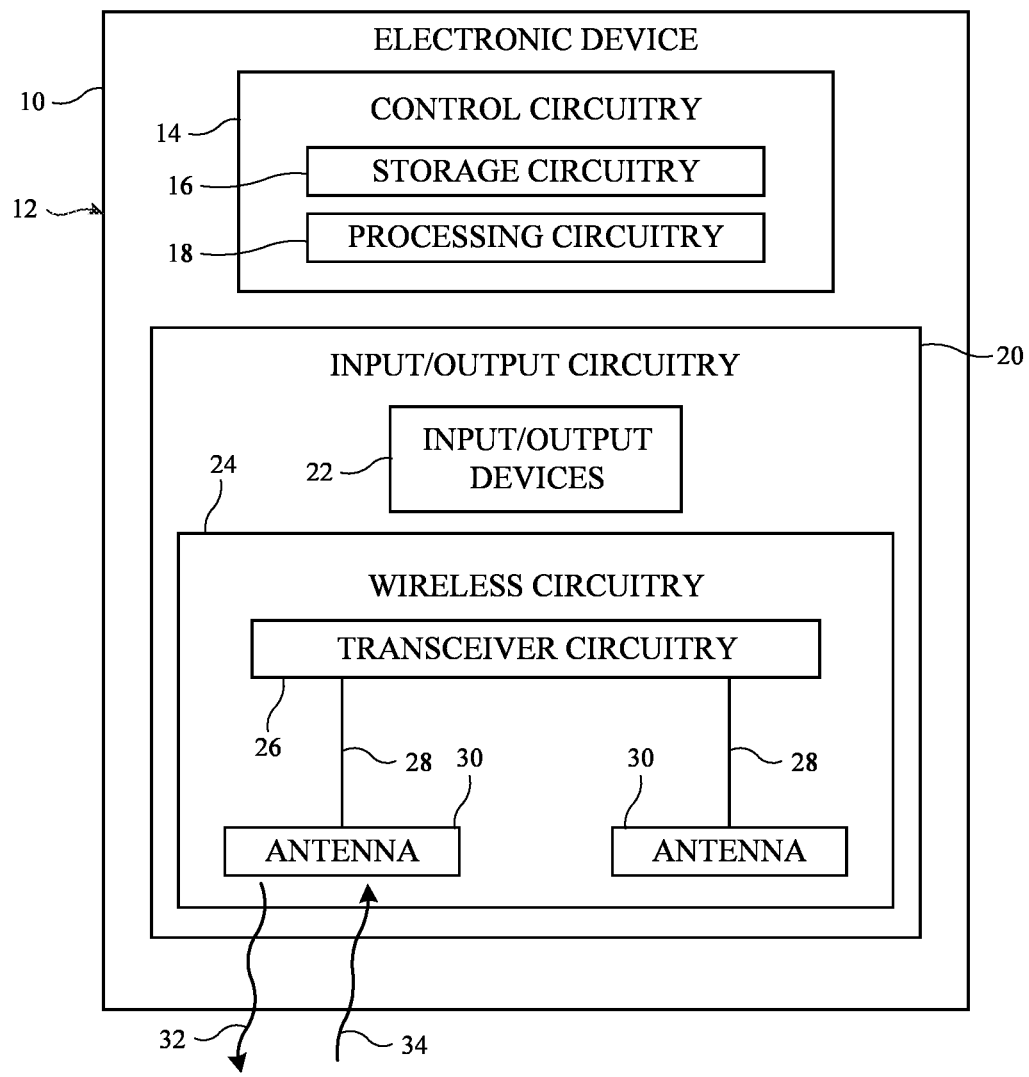
FIG. 1 is a block diagram of an illustrative electronic device having wireless circuitry with at least one antenna that conveys wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30.

Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than about 100 GHz.

As shown in FIG. 1, wireless circuitry 24 may transmit wireless signals 32 and may receive wireless signals 34 at frequencies greater than around 100 GHz (e.g., greater than 70 GHz, 80 GHz, 90 GHz, 110 GHz, etc.). Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 34. However, handling transmission of THE signals 32 and reception of THF signals 34 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and that receives THF signals 34 within a corresponding signal beam oriented in a selected beam pointing direction.

It can be challenging to incorporate components into wireless circuitry 24 that support wireless communications at these high frequencies. If desired, transceiver circuitry 26 and signal paths 28 may include optical components that convey optical signals to support the transmission of THF signals 32 and the reception of THF signals 34 in a space and resource-efficient manner. The optical signals may be used in transmitting THF signals 32 at THF frequencies and in receiving THF signals 34 at THF frequencies.

Figure 2:
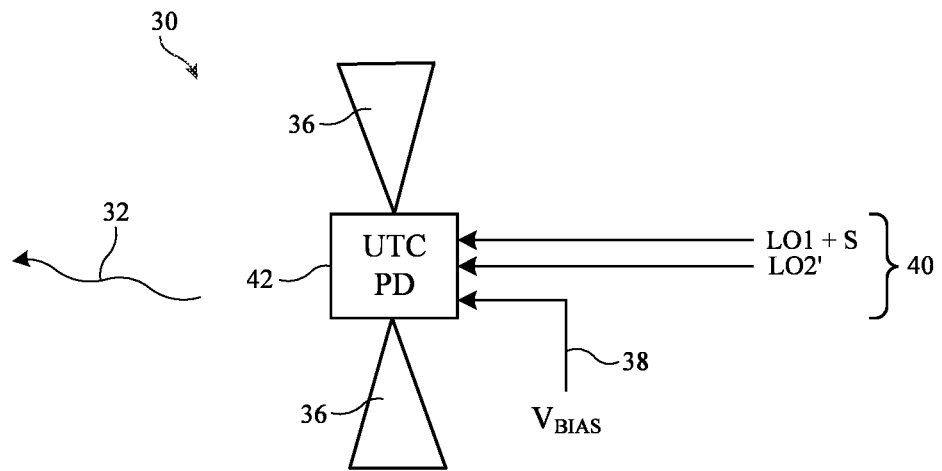
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THF signals 32 and to receive THF signals 34 using optical signals. Antenna 30 may include one or more antenna radiating (resonating) elements 36 such as radiating (resonating) element arms. In the example of FIG. 2, antenna 30 is a planar dipole antenna (sometimes referred to as a "bowtie" antenna) having an antenna resonating element 36 with two opposing resonating element arms (e.g., bowtie arms or dipole arms). This is merely illustrative and, in general, antenna 30 may be any type of antenna having any desired antenna radiating element architecture.

As shown in FIG. 2, antenna 30 includes a photodiode (PD) 42 coupled between the arms of antenna resonating element 36. Electronic devices that include antennas 30 with photodiodes 42 such as device 10 may sometimes also be referred to as electro-optical devices (e.g., electro-optical device 10). Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is merely illustrative and, in general, photodiode 42 may include any desired type of adjustable/programmable photodiode or component that converts electromagnetic energy at optical frequencies to current at THF frequencies on antenna resonating element 36 and/or vice versa (e.g., a p-i-n diode, a tunneling diode, a TW UTC photodiode, other diodes with quadratic characteristics, an LT-GaAS photodiode, an M-UTC photodiode, etc.). Each radiating element arm in antenna resonating element 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal (input) 38 that receives one or more control signals $V_{BIAS}$. Control signals $V_{BIAS}$ may include bias voltages provided at one or more voltage levels and/or other control signals for controlling the operation of UTC PD 42 such as impedance adjustment control signals for adjusting the output impedance of UTC PD 42. Control circuitry 14 (FIG. 1) may provide (e.g., apply, supply, assert, etc.) control signals $V_{BIAS}$ at different settings (e.g., values, magnitudes, etc.) to dynamically control (e.g., program or adjust) the operation of UTC PD 42 over time. For example, control signals $V_{BIAS}$ may be used to control whether antenna 30 transmits THF signals 32 or receives THF signals 34. When control signals $V_{BIAS}$ include a bias voltage asserted at a first level or magnitude, antenna 30 may be configured to transmit THF signals 32. When control signals $V_{BIAS}$ include a bias voltage asserted at a second level or magnitude, antenna 30 may be configured to receive THF signals 34. In the example of FIG. 2, control signals $V_{BIAS}$ include the bias voltage asserted at the first level to configure antenna 30 to transmit THF signals 32. If desired, control signals $V_{BIAS}$ may also be adjusted to control the waveform of the THF signals (e.g., as a squaring function that preserves the modulation of incident optical signals, a linear function, etc.), to perform gain control on the signals conveyed by antenna 30, and/or to adjust the output impedance of UTC PD 42.

As shown in FIG. 2, UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of the radiating element arms in antenna resonating element 36. The frequency of the antenna current is equal to the frequency difference between local oscillator signal LO1 and modulated local oscillator signal LO2'. The antenna currents may radiate (transmit) THF signals 32 into free space. Control signal $V_{BIAS}$ may control UTC PD 42 to convert the optical local oscillator signals into antenna currents on the radiating element arms in antenna resonating element 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
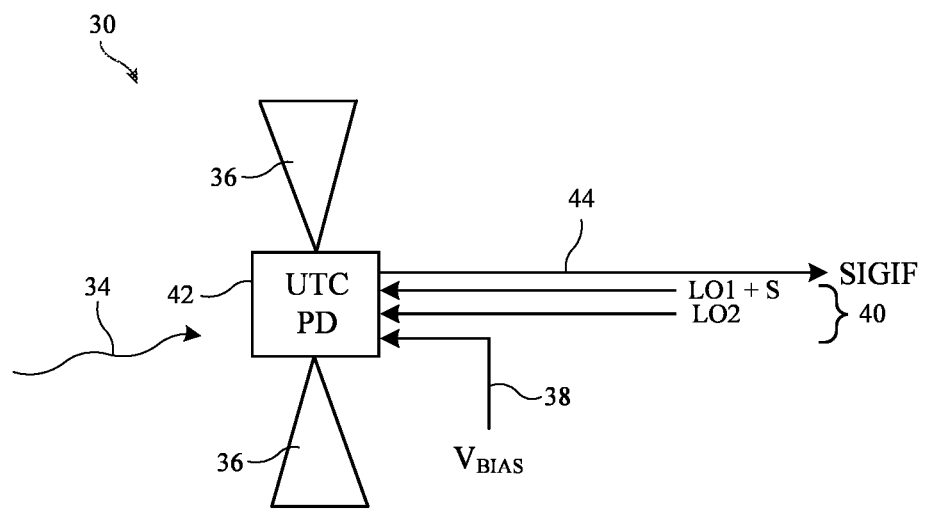
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THY signals 34 (e.g., after changing the setting of control signals $V_{BIAS}$ into a reception state from the transmission state of FIG. 2). As shown in FIG. 3, THY signals 34 may be incident upon the antenna radiating element arms of antenna resonating element 36. The incident THF signals 34 may produce antenna currents that flow around the perimeter of the radiating element arms in antenna resonating element 36. UTC PD 42 may use optical local oscillator signal LO1 (plus the optical phase shift S when applied), optical local oscillator signal LO2 (e.g., without modulation), and control signals $V_{BIAS}$ (e.g., a bias voltage asserted at the second level) to convert the received THF signals 34 into intermediate frequency signals SIGIF that are output onto intermediate frequency signal path 44.

The frequency of intermediate frequency signals SIGIF may be equal to the frequency of THF signals 34 minus the difference between the frequency of optical local oscillator signal LO1 and the frequency of optical local oscillator signal LO2. As an example, intermediate frequency signals SIGIF may be at lower frequencies than THF signals 32 and 34 such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 34 in intermediate signals SIGIF. A receiver in transceiver circuitry 26 (FIG. 1) may demodulate intermediate frequency signals SIGIF (e.g., after further downconversion) to recover the wireless data from THF signals 34. In another example, wireless circuitry 24 may convert intermediate frequency signals SIGIF to the optical domain before recovering the wireless data. In yet another example, intermediate frequency signal path 44 may be omitted and UTC PD 42 may convert THF signals 34 into the optical domain for subsequent demodulation and data recovery (e.g., in a sideband of the optical signal).

Figure 4:
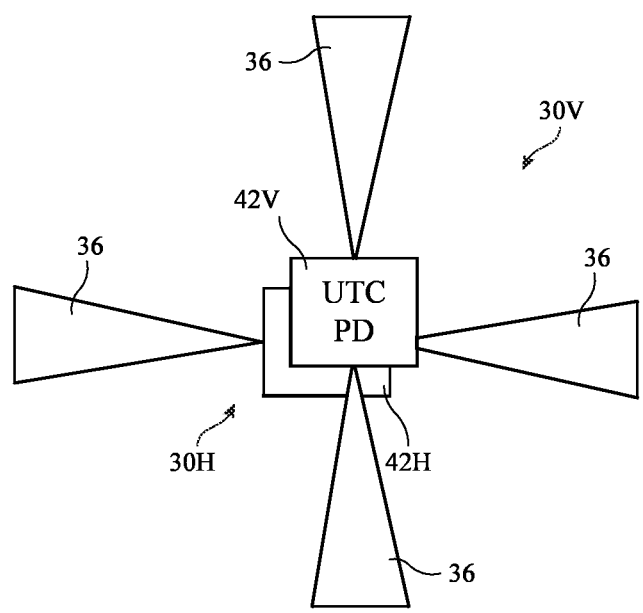
FIG. 4 is a top view showing how multiple antennas of the type shown in FIGS. 2 and 3 may be stacked to cover multiple polarizations in accordance with some embodiments.

The antenna 30 of FIGS. 2 and 3 may support transmission of THF signals 32 and reception of THF signals 34 with a given polarization (e.g., a linear polarization such as a vertical polarization). If desired, wireless circuitry 24 (FIG. 1) may include multiple antennas 30 for covering different polarizations. FIG. 4 is a diagram showing one example of how wireless circuitry 24 may include multiple antennas 30 for covering different polarizations.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms in antenna resonating element 36. Antenna 30H may have a UTC PD 42 such as UTC PD 42H coupled between a corresponding pair of radiating element arms in antenna resonating element 36 oriented non-parallel (e.g., orthogonal) to the radiating element arms in antenna resonating element 36 of antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The antenna resonating element 36 in antenna 30V may be formed on a separate layer of the substrate than the antenna resonating element 36 in antenna 30H or the antenna resonating element 36 in antenna 30V may be formed on the same layer of the substrate as the antenna resonating element 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the antenna resonating element 36 in antenna 30V or may be formed on a separate layer of the substrate as the antenna resonating element 36 in antenna 30V. UTC PD 42H may be formed on the same layer of the substrate as the antenna resonating element 36 in antenna 30H or may be formed on a separate layer of the substrate as the antenna resonating element 36 in antenna 30H.

Figure 5:
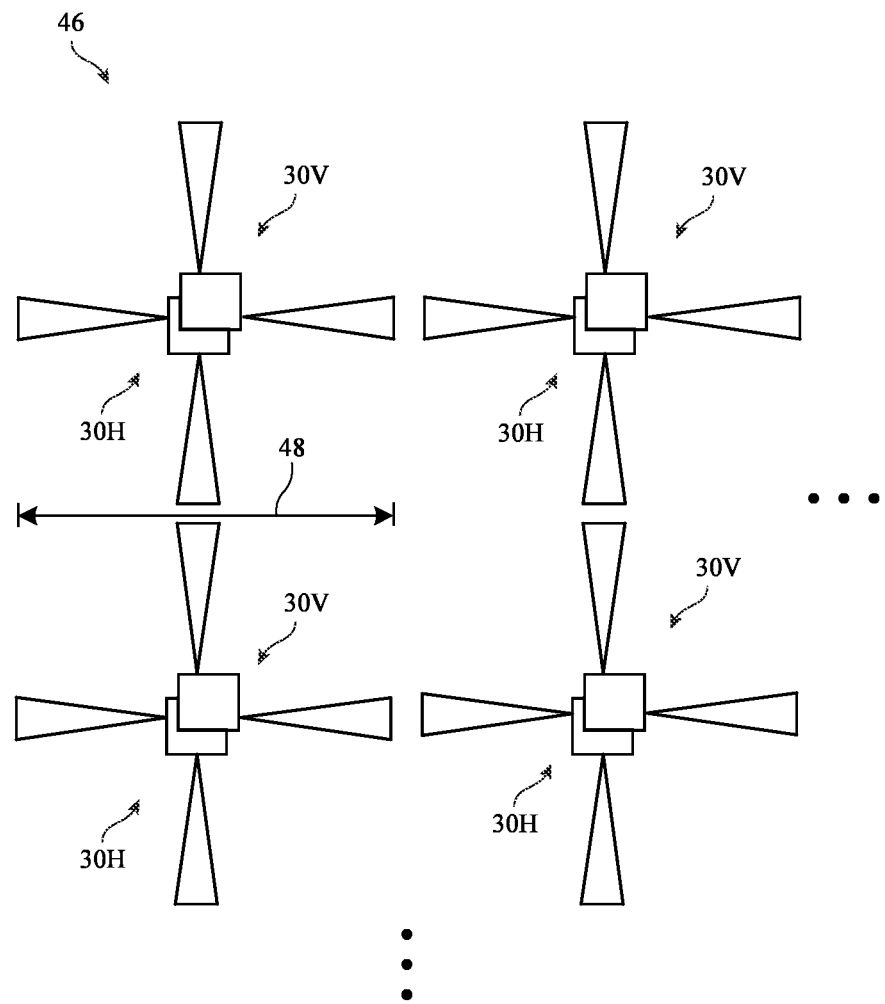
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, device 10 may include a phased antenna array 46 of stacked antennas 30H and 30V arranged in a rectangular grid of rows and columns. Each of the antennas in phased antenna array 46 may be formed on the same substrate. This is merely illustrative. In general, phased antenna array 46 (sometimes referred to as a phased array antenna) may include any desired number of antennas 30V and 30H (or non-stacked antennas 30) arranged in any desired pattern. Each of the antennas in phased antenna array 46 may be provided with a respective optical phase shift S (FIGS. 2 and 3, sometimes also annotated herein as optical phase shift φ) that configures the antennas to collectively transmit THF signals 32 and/or receive THF signals 34 that sum to form a signal beam of THF signals in a desired beam pointing direction. The beam pointing direction may be selected to point the signal beam towards external communications equipment, towards a desired external object, away from an external object, etc.

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32 and 34. For example, length 48 may be as small as 0.5 mm or less. Each UTC-PD 42 in phased antenna array 46 may occupy a lateral area of 100 square microns or less. This may allow phased antenna array 46 to occupy very little area within device 10, thereby allowing the phased antenna array to be integrated within different portions of device 10 while still allowing other space for device components. The examples of FIGS. 2-5 are merely illustrative and, in general, each antenna may have any desired antenna radiating element architecture.

Figure 6:
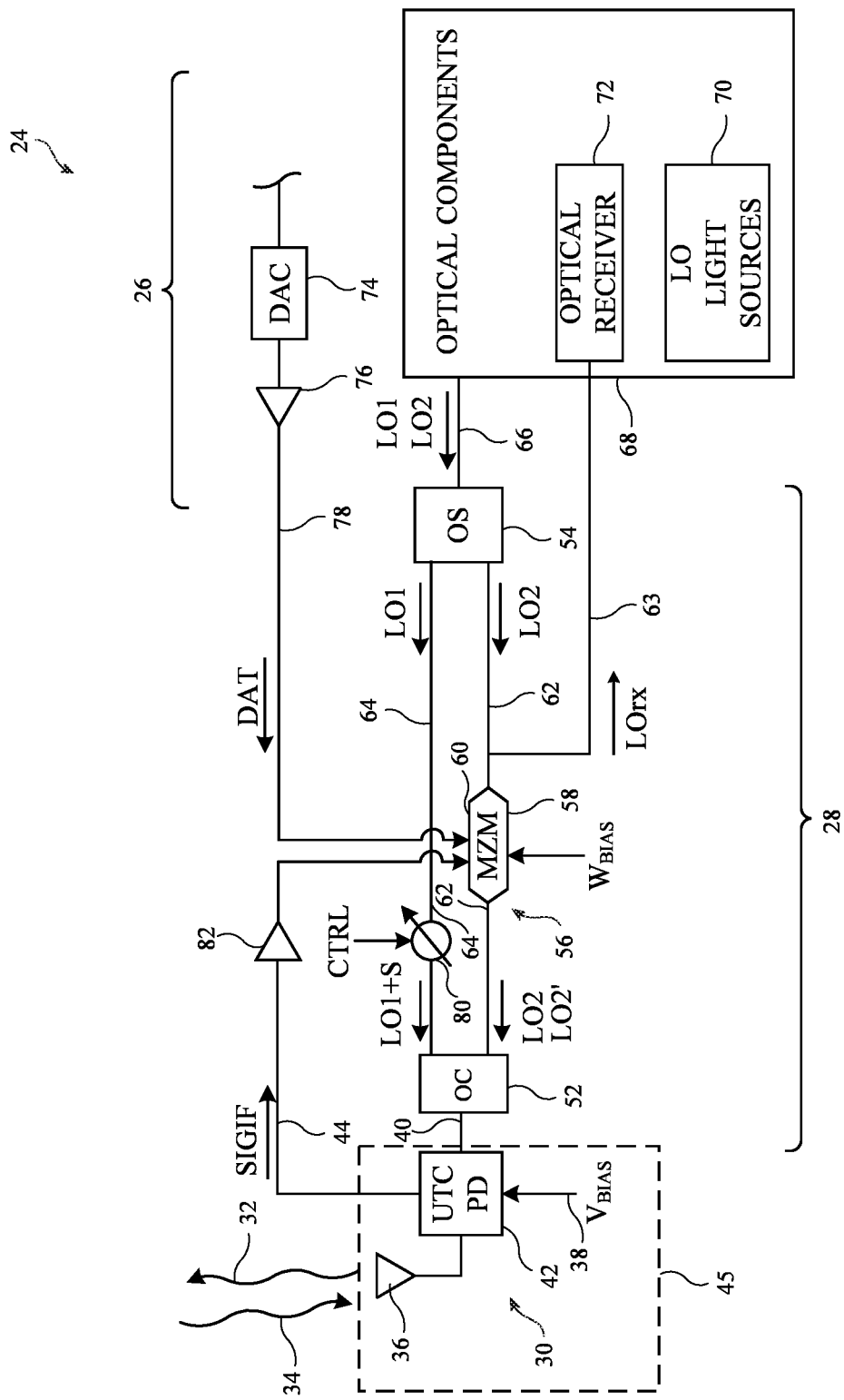
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30 and signal path 28 (FIG. 1) may be used to both transmit THF signals 32 and receive THF signals 34 based on optical local oscillator signals. In the example of FIG. 6, UTC PD 42 converts received THF signals 34 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) in antenna resonating element 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources such as laser light sources, laser diodes, optical phase locked loops, or other optical emitters that emit light (e.g., optical local oscillator signals LO1 and LO2) at respective wavelengths. If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40.

An optical phase shifter such as optical phase shifter 80 may be (optically) interposed on or along optical path 64. An electro-optical modulator such as electro-optical modulator 56 (sometimes referred to herein as optical modulator 56) may be disposed on or along optical path 62. Electro-optical modulator 56 may be, for example, a Mach-Zehnder modulator (MZM) and may therefore sometimes be referred to herein as MZM 56. Electro-optical modulator 56 may include a first optical arm (branch) 60 and a second optical arm (branch) 58 interposed in parallel along optical path 62. Propagating optical local oscillator signal LO2 along arms 60 and 58 of electro-optical modulator 56 may, in the presence of a voltage signal applied to one or both arms, allow different optical phase shifts to be imparted on each arm before recombining the signal at the output of the electro-optical modulator (e.g., where optical phase modulations produced on the arms are converted to intensity modulations at the output of electro-optical modulator 56). When the voltage applied to electro-optical modulator 56 includes wireless data, electro-optical modulator 56 may modulate the wireless data onto optical local oscillator signal LO2. If desired, the phase shifting performed at electro-optical modulator 56 may be used to perform beam forming/steering in addition to or instead of optical phase shifter 80. Electro-optical modulator 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place electro-optical modulator 56 into different operating modes (e.g., operating modes that suppress optical carrier signals, operating modes that do not suppress optical carrier signals, etc.).

Intermediate frequency signal path 44 may couple UTC PD 42 to electro-optical modulator 56 (e.g., arm 60). An amplifier such as low noise amplifier 82 may be interposed on intermediate frequency signal path 44. Intermediate frequency signal path 44 may be used to pass intermediate frequency signals SIGIF from UTC PD 42 to electro-optical modulator 56. DAC 74 (e.g., an I/Q DAC) may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to electro-optical modulator 56 (e.g., arm 60). Each of the components along signal path 28 may allow the same antenna 30 to both transmit THF signals 32 and receive THF signals 34 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32/34). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry 14 (FIG. 1) may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32/34 in a desired pointing direction. Optical phase shifter 80 may pass the phase-shifted optical local oscillator signal LO1 (denoted as LO1+S or LO1+φ) to optical combiner 52. Signal beam steering is performed in the optical domain (e.g., using optical phase shifter 80) rather than in the THY domain because there are no satisfactory phase shifting circuit components that operate at frequencies as high as the frequencies of THF signals 32 and 34. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THY signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to electro-optical modulator 56 (e.g., arm 60). Electro-optical modulator 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry 14 (FIG. 1) may apply a control signal $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on antenna resonating element 36 at the frequency of THF signals 32 (e.g., while programmed for transmission using control signal $V_{BIAS}$). The antenna currents on antenna resonating element 36 may radiate THY signals 32. The frequency of THF signals 32 is given by the difference in frequency between optical local oscillator signal LO1 and modulated optical local oscillator signal LO2'. Control signals $V_{BIAS}$ may control UTC PD 42 to preserve the modulation from modulated optical local oscillator signal LO2' in the radiated THF signals 32. External equipment that receives THF signals 32 will thereby be able to extract data DAT from the THY signals 32 transmitted by antenna 30.

During reception of THF signals 34, electro-optical modulator 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry 14 (FIG. 1) may apply a control signal $V_{BIAS}$ (e.g., a bias voltage) to UTC PD 42 that configures antenna 30 for the receipt of THY signals 32. UTC PD 42 may use optical local oscillator signals LO1 and LO2 to convert the received THF signals 34 into intermediate frequency signals SIGIF output onto intermediate frequency signal path 44 (e.g., while programmed for reception using bias voltage $V_{BIAS}$). Intermediate frequency signals SIGIF may include the modulated data from the received THF signals 34. Low noise amplifier 82 may amplify intermediate frequency signals SIGIF, which are then provided to electro-optical modulator 56 (e.g., arm 60). Electro-optical modulator 56 may convert intermediate frequency signals SIGIF to the optical domain as optical signals LOrx (e.g., by modulating the data in intermediate frequency signals SIGIF onto one of the optical local oscillator signals) and may pass the optical signals to optical receiver 72 in optical components 68, as shown by arrow 63 (e.g., via optical paths 62 and 66 or other optical paths). Control circuitry 14 (FIG. 1) may use optical receiver 72 to convert optical signals LOrx to other formats and to recover (demodulate) the data carried by THF signals 34 from the optical signals. In this way, the same antenna 30 and signal path 28 may be used for both the transmission and reception of THF signals while also performing beam steering operations.

The example of FIG. 6 in which intermediate frequency signals SIGIF are converted to the optical domain is merely illustrative. If desired, transceiver circuitry 26 may receive and demodulate intermediate frequency signals SIGIF without first passing the signals to the optical domain. For example, transceiver circuitry 26 may include an analog-to-digital converter (ADC), intermediate frequency signal path 44 may be coupled to an input of the ADC rather than to electro-optical modulator 56, and the ADC may convert intermediate frequency signals SIGIF to the digital domain. As another example, intermediate frequency signal path 44 may be omitted and control signals $V_{BIAS}$ may control UTC PD 42 to directly sample THF signals 34 with optical local oscillator signals LO1 and LO2 to the optical domain. As an example, UTC PD 42 may use the received THF signals 34 and control signals $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 34. Signal path 28 may direct (propagate) the optical signal produced by UTC PD 42 to optical receiver 72 in optical components 68 (e.g., via optical paths 40, 64, 62, 66, 63, and/or other optical paths). Control circuitry 14 (FIG. 1) may use optical receiver 72 to convert the optical signal to other formats and to recover (demodulate) the data carried by THF signals 34 from the optical signal (e.g., from the sidebands of the optical signal). If desired, antenna 30 may be integrated into an access point 45.

Figure 7:
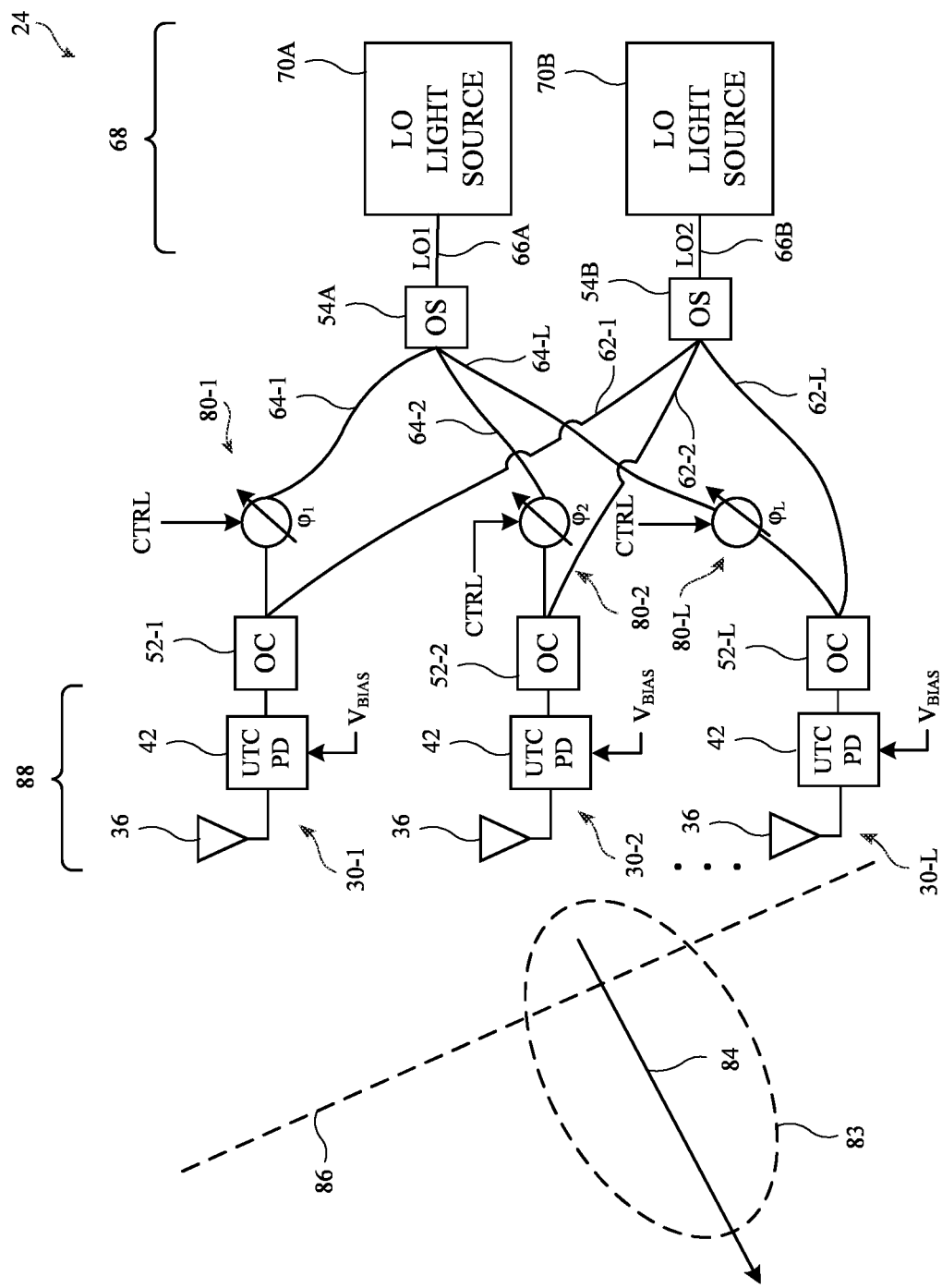
FIG. 7 is a circuit diagram of an illustrative phased antenna array that conveys wireless signals at frequencies greater than about 100 GHz within a corresponding signal beam in accordance with some embodiments.

FIG. 7 is a circuit diagram showing one example of how multiple antennas 30 may be integrated into a phased antenna array 88 that conveys THF signals over a corresponding signal beam. In the example of FIG. 7, electro-optical modulators 56, intermediate frequency signal paths 44, data paths 78, and optical receiver 72 of FIG. 6 have been omitted for the sake of clarity. Each of the antennas in phased antenna array 88 may alternatively sample received THF signals directly into the optical domain or may pass intermediate frequency signals SIGIF to ADCs in transceiver circuitry 26.

As shown in FIG. 7, phased antenna array 88 includes L antennas 30 such as a first antenna 30-1, a second antenna 30-2, an Lth antenna 30-L, etc. Each of the antennas 30 in phased antenna array 88 may be coupled to optical components 68 via a respective optical signal path (e.g., optical signal path 28 of FIG. 6). Each of the L signal paths may include a respective optical combiner 52 coupled to the UTC PD 42 of the corresponding antenna 30 (e.g., the UTC PD 42 in antenna 30-1 may be coupled to optical combiner 52-1, the UTC PD 42 in antenna 30-2 may be coupled to optical combiner 52-2, the UTC PD 42 in antenna 30-L may be coupled to optical combiner 52-L, etc.). Each of the L signal paths may also include a respective optical path 62 and a respective optical path 64 coupled to the corresponding optical combiner 52 (e.g., optical paths 64-1 and 62-1 may be coupled to optical combiner 52-1, optical paths 64-2 and 62-2 may be coupled to optical combiner 52-2, optical paths 64-L and 62-L may be coupled to optical combiner 52-L, etc.).

Optical components 68 may include LO light sources 70 such as a first LO light source 70A and a second LO light source 70B. The optical signal paths for each of the antennas 30 in phased antenna array 88 may share one or more optical splitters 54 such as a first optical splitter 54A and a second optical splitter 54B. LO light source 70A may generate (e.g., produce, emit, transmit, etc.) first optical local oscillator signal LO1 and may provide first optical local oscillator signal LO1 to optical splitter 54A via optical path 66A. Optical splitter 54A may distribute first optical local oscillator signal LO1 to each of the UTC PDs 42 in phased antenna array 88 over optical paths 64 (e.g., optical paths 64-1, 64-2, 64-L, etc.). Similarly, LO light source 70B may generate (e.g., produce, emit, transmit, etc.) second optical local oscillator signal LO2 and may provide second optical local oscillator signal LO2 to optical splitter 54B via optical path 66B. Optical splitter 54B may distribute second optical local oscillator signal LO2 to each of the UTC PDs 42 in phased antenna array 88 over optical paths 62 (e.g., optical paths 62-1, 62-2, 62-L, etc.).

A respective optical phase shifter 80 may be interposed along (on) each optical path 64 (e.g., a first optical phase shifter 80-1 may be interposed along optical path 64-1, a second optical phase shifter 80-2 may be interposed along optical path 64-2, an Lth optical phase shifter 80-L may be interposed along optical path 64-L, etc.). Each optical phase shifter 80 may receive a control signal CTRL that controls the optical phase shift φ provided to optical local oscillator signal LO1 by that optical phase shifter (e.g., first optical phase shifter 80-1 may impart an optical phase shift $\varphi_1$ to the optical local oscillator signal LO1 provided to antenna 30-1, second optical phase shifter 80-2 may impart an optical phase shift of $\varphi_2$ to the optical local oscillator signal LO1 provided to antenna 30-2, Lth optical phase shifter 80-L may impart an optical phase shift of $\varphi_L$ to the optical local oscillator signal LO1 provided to antenna 30-L, etc. By adjusting the phase shift φ imparted by each of the L optical phase shifters 80, control circuitry 14 (FIG. 1) may control each of the antennas 30 in phased antenna array 88 to transmit THF signals 32 and/or to receive THF signals 34 within a formed signal beam 83. Signal beam 83 may be oriented in a particular beam pointing direction (angle) 84 (e.g., the direction of peak gain of signal beam 83). The THF signals conveyed by phased antenna array 88 may have wavefronts 86 that are orthogonal to beam pointing direction 84. Control circuitry 14 may adjust beam pointing direction 84 over time to point towards external communications equipment or an external object or to point away from external objects, as examples.

In the example of FIG. 7, phased antenna array 88 only forms a single signal beam 83 that conveys a single stream of wireless data at any given time. It may be desirable for wireless circuitry 24 to concurrently form multiple signal beams 83 for conveying multiple different streams of wireless data at the same time. The multiple signal beams may be oriented in the same direction (e.g., effectively doubling the data rate for an external device located in that direction) or in different directions (e.g., for concurrently communicating with multiple external devices at different locations, performing radio-based sensing in multiple directions, performing concurrent communication and sensing in different directions, etc.). Phased antenna array 88 may sometimes be referred to herein as a fully connected phased antenna array when configured to concurrently form multiple signal beams 83 for conveying multiple streams of wireless data at the same time.

Figure 8:
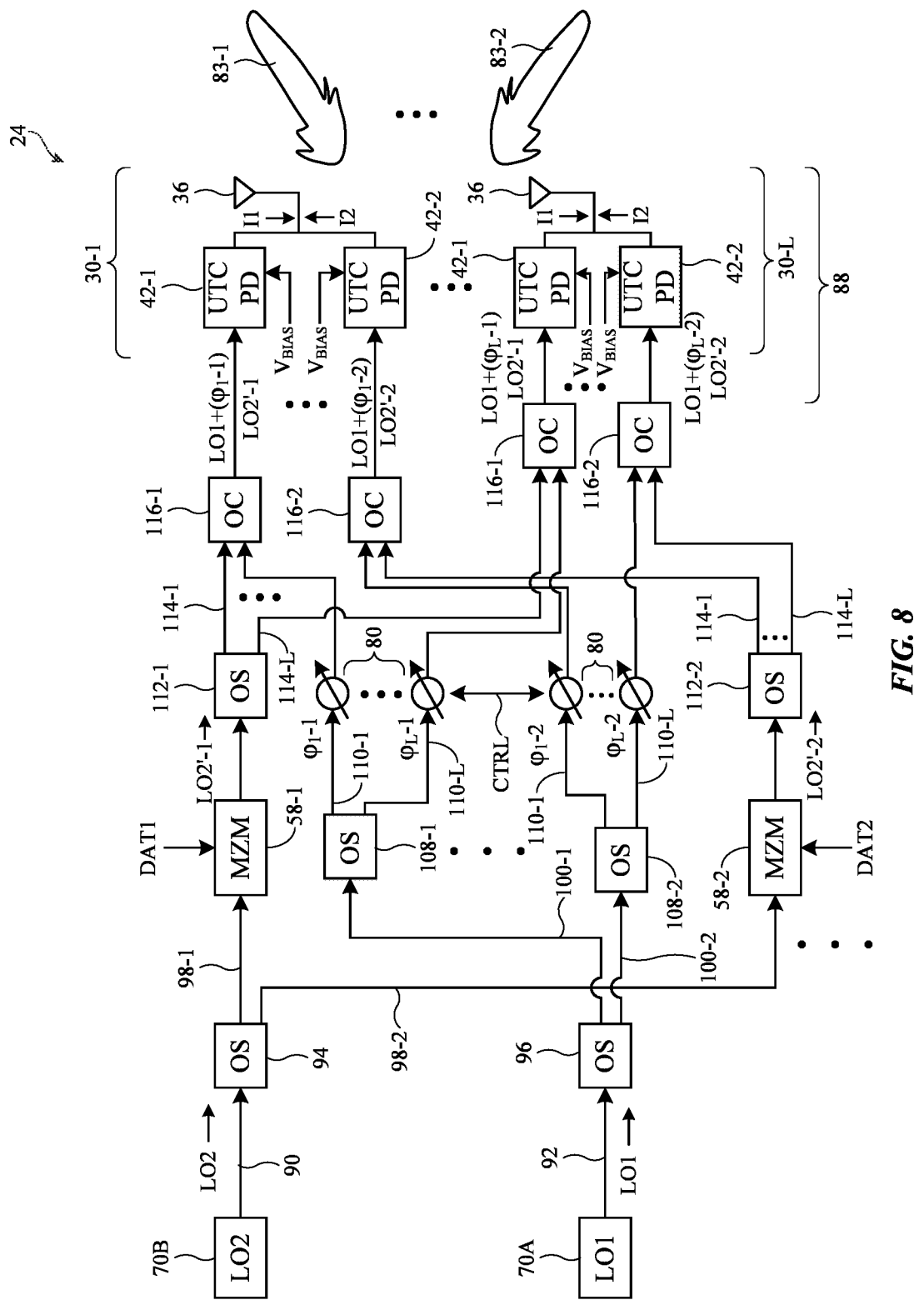
FIG. 8 is a circuit diagram of an illustrative fully connected phased antenna array that concurrently conveys multiple wireless data streams in different signal beams in accordance with some embodiments.

FIG. 8 is a circuit diagram showing one example of how wireless circuitry 24 may include and feed a fully connected phased antenna array 88 that concurrently forms multiple signal beams 83 for conveying multiple streams of wireless data at the same time. In general, wireless circuitry 24 may concurrently convey K different streams of wireless data using K different signal beams, where K is any integer greater than 1. FIG. 8 illustrates a simplest case for the sake of clarity, where K=2 and wireless circuitry concurrently conveys two different streams of wireless data using two different signal beams. This is illustrative and, if desired, the components shown in FIG. 8 may be repeated to support implementations where K>2.

As shown in FIG. 8, phased antenna array 88 may include L antennas 30. Only the first antenna 30-1 and the Lth antenna 30-L in phased antenna array 88 are shown in FIG. 8 for the sake of clarity. Each antenna 30 may include at least K different UTC PDs 42 coupled to the same antenna resonating element 36. Since K=2 in the example of FIG. 8, each antenna 30 in phased antenna array 88 includes at least a first UTC PD 42-1 and a second UTC PD 42-2 coupled to a respective antenna resonating element 36 (e.g., where each antenna 30 includes a single antenna resonating element 36 or two orthogonal antenna resonating elements 36 when multiple polarizations are used).

For each antenna 30, wireless circuitry 24 may include a respective optical combiner (OC) 116 coupled to each UTC PD 42 in each antenna 30 (e.g., each antenna 30 may be coupled to at least K optical combiners 116). Optical paths may be used to couple optical combiners 116 to UTC PDs 42. For example, as shown in FIG. 8, wireless circuitry 24 may include first optical combiners 116-1 having outputs optically coupled to (e.g., that illuminate) the UTC PD 42-1 in each antenna 30 of phased antenna array 88. Wireless circuitry 24 may also include second optical combiners 116-2 having outputs optically coupled to (e.g., that illuminate) the UTC PD 42-2 in each antenna 30 of phased antenna array 88.

LO light source 70B may be optically coupled to the input of optical splitter (OS) 94 over optical path 90. LO light source 70A may be optically coupled to the input of optical splitter 96 over optical path 92. Wireless circuitry 24 may have K different electro-optical modulators 58 and K different optical splitters 112. Optical splitter 94 may have K outputs. Each output of optical splitter 94 may be coupled to the input of a respective one of the K optical splitters 112 over a respective optical path 98. Each of the K electro-optical modulators 58 may be disposed on a respective one of the K different optical paths 98. In other words, each of the K electro-optical modulators 58 in wireless circuitry 24 may have an output coupled to the input of a respective one of the K optical splitters 112. For example, as shown in FIG. 8, wireless circuitry 24 may include at least a first electro-optical modulator 58-1 and a second electro-optical modulator 58-2. Optical splitter 94 may have a first output coupled to the input of optical splitter 112-1 over optical path 98-1 and a second output coupled to the input of optical splitter 112-2 over optical path 98-2. Electro-optical modulator 58-1 may be disposed on optical path 98-1 whereas electro-optical modulator 58-2 is disposed on optical path 98-2.

Each optical splitter 112 may have L outputs, where each output is coupled to an input of one of the optical combiners 116 for each antenna 30 in phased antenna array 88 over a corresponding optical path 114. For example, as shown in FIG. 8, a first optical path 114-1 may couple a first output of optical splitter 112-1 to an input of optical combiner 116-1 for antenna 30-1, an Lth optical path 114-L may couple an Lth output of optical splitter 112-1 to an input of optical combiner 116-1 for antenna 30-L, a first optical path 114-1 may couple a first output of optical splitter 112-2 to an input of optical combiner 116-2 for antenna 30-1, an Lth optical path 114-L may couple an Lth output of optical splitter 112-2 to an input of optical combiner 116-2 for antenna 30-L, etc.

Wireless circuitry 24 may also have K optical splitters 108 such as at least a first optical splitter 108-1 and a second optical splitter 108-2. Optical splitter 96 may have K outputs, each coupled to the input of a respective one of the K optical splitters 108 over a respective optical path 100. For example, as shown in FIG. 8, optical splitter 96 may have a first output coupled to the input of optical splitter 108-1 over optical path 100-1 and may have a second output coupled to the input of optical splitter 108-2 over optical path 100-2.

Each optical splitter 108 may have L different outputs each coupled to an optical combiner 116 for a respective one of the L antennas 30-1 in phased antenna array 88. For example, as shown in FIG. 8, optical splitter 108-1 may have a first output coupled to an input of the optical combiner 116-1 for antenna 30-1 over an optical path 110-1, may have an Lth output coupled to an input of the optical combiner 116-1 for antenna 30-L over an optical path 110-L, etc. Similarly, optical splitter 108-2 may have a first output coupled to an input of the optical combiner 116-2 for antenna 30-1 over an optical path 110-1, may have an Lth output coupled to an input of the optical combiner 116-2 for antenna 30-L over an optical path 110-L, etc.

There may be a set of L optical phase shifters 80 disposed on the L optical paths 110 coupled to each optical splitter 108-1. For example, as shown in FIG. 8, a first set of L optical phase shifters 80 may be disposed on the optical paths 110 that couple optical splitter 108-1 to phased antenna array 88 whereas a second set of L optical phase shifters 80 may be disposed on the optical paths 110 that couple optical splitter 108-2 to phased antenna array 88. Each set of optical phase shifters 80 may be controlled (e.g., using control signals CTRL) to impart a different respective set of optical phase shifts to the optical signals on optical paths 110. For example, the optical phase shifters 80 coupled to optical splitter 108-1 may apply a first set of optical phase shifts $\varphi$-1 whereas the optical phase shifters 80 coupled to optical splitter 108-2 may apply a second set of optical phase shifts $\varphi$-2.

Each set of optical phase shifts $\varphi$ may include L different optical phase shifts $\varphi$, each for the optical signals on a respective one of optical paths 110. For example, as shown in FIG. 8, the optical phase shifters 80 coupled between optical splitter 108-1 and phased antenna array 88 may include a first optical phase shifter 80 that applies a first optical phase shift 91-1 to optical signals on the optical path 110-1 coupled between optical splitter 108-1 and the optical combiner 116-1 for antenna 30-1, may include an Lth optical phase shifter 80 that applies an Lth optical phase shift $\varphi_L$-1 to optical signals on the optical path 110-L coupled between optical splitter 108-1 and the optical combiner 116-1 for antenna 30-L, etc. Similarly, the optical phase shifters 80 coupled between optical splitter 108-2 and phased antenna array 88 may include a first optical phase shifter 80 that applies a first optical phase shift $\varphi_1$-2 to optical signals on the optical path 110-1 coupled between optical splitter 108-2 and the optical combiner 116-2 for antenna 30-1, may include an Lth optical phase shifter 80 that applies an Lth optical phase shift $\varphi_L$-2 to optical signals on the optical path 110-L coupled between optical splitter 108-2 and the optical combiner 116-2 for antenna 30-L, etc. In this way, each of the at least K optical combiners 116 for each of the L antennas 30 in phased antenna array 88 may have at least a first input optically coupled to the output of an electro-optical modulator 58 and a second input optically coupled to an optical phase shifter 80. The optical paths of FIG. 8 may each include optical fibers and/or waveguides, for example.

The example of FIG. 8 shows how wireless circuitry 24 may transmit wireless signals using phased antenna array 88 for the sake of simplicity. Additionally or alternatively, wireless circuitry 24 may be adapted to receive wireless signals using phased antenna array 88 (e.g., using receive paths similar to as shown in FIG. 6). During signal transmission, LO light source 70A may generate (emit) optical local oscillator signal LO1 on optical path 92. LO light source 70B may generate (emit) optical local oscillator signal LO2 on optical path 90. Optical splitter 94 may split optical local oscillator signal LO2 across each of its K outputs to provide optical local oscillator signal LO2 to the input of each of the K electro-optical modulators 58 in wireless circuitry 24. For example, as shown in FIG. 8, optical splitter 94 may provide optical local oscillator signal LO2 to electro-optical modulator 58-1 over optical path 98-1 and to electro-optical modulator 58-2 over optical path 98-2.

Each of the K electro-optical modulators 58 in wireless circuitry 24 may receive (e.g., from one or more DACs) a respective stream of wireless data DAT (e.g., at electrodes of the electro-optical modulators). The wireless data in each stream may be different. Wireless data DAT may include wireless communication data or any other desired modulation such as a modulation for use in performing spatial ranging or sensing (e.g., a radar waveform modulation). In examples where wireless data DAT includes wireless communication data, the wireless communication data may be wireless communication data for transmission to a respective one of K different external devices or, if desired, may be wireless communication data for transmission to fewer than K external devices (e.g., a single external device provided with boosted communication capacity). For example, electro-optical modulator 58-1 may receive a first stream of wireless data DAT1 (sometimes referred to herein as wireless data stream DAT1) whereas electro-optical modulator 58-2 receives a second stream of wireless data DAT2 (sometimes referred to herein as wireless data stream DAT2).

Each electro-optical modulator 58 may modulate the optical local oscillator signal LO2 received over the corresponding optical path 98-1 using its wireless data stream DAT to generate a corresponding modulated optical signal LO2'. For example, electro-optical modulator 58-1 may modulate wireless data stream DAT1 onto optical local oscillator signal LO2 to generate modulated optical signal LO2'-1 and electro-optical modulator 58-2 may modulate wireless data stream DAT2 onto optical local oscillator signal LO2 to generate modulated optical signal LO2'-2. Modulated optical signals LO2' are modulated optical waveforms that contain the modulation specified by the corresponding wireless data stream DAT (e.g., for conveying wireless communications data or sensing signals such as radar signals).

Each of the K optical splitters 112 may receive a respective one of the K modulated optical signals LO2' from a respective one of the K electro-optical modulators 58. Each of the K optical splitters 112 may distribute its received modulated optical signal LO2' to an optical combiner 116 in each of the L antennas 30 by coupling the modulated optical signal LO2' onto the L optical paths 114 coupled to that optical splitter 112. For example, as shown in FIG. 8, optical splitter 112-1 may transmit modulated optical signal LO2'-1 to the optical combiner 116-1 for antenna 30-1 over the corresponding optical path 114-1, may transmit modulated optical signal LO2'-1 to the optical combiner 116-2 for antenna 30-L over the corresponding optical path 114-L, etc. Similarly, optical splitter 112-2 may transmit modulated optical signal LO2'-2 to the optical combiner 116-2 for antenna 30-1 over the corresponding optical path 114-1, may transmit modulated optical signal LO2'-2 to the optical combiner 116-2 for antenna 30-L over the corresponding optical path 114-L, etc.

At the same time, optical splitter 96 may split optical local oscillator signal LO1 across each of its K outputs to provide optical local oscillator signal LO1 to the input of each of the K optical splitters 108 in wireless circuitry 24 (over optical paths 100). For example, as shown in FIG. 8, optical splitter 96 may provide optical local oscillator signal LO1 to optical splitter 108 over optical path 110-1 and may provide optical local oscillator signal LO1 to optical splitter 108-2 over optical path 110-2.

Each of the K optical splitters 108 may transmit optical local oscillator signal LO1 onto the L optical paths 110 coupled to that optical splitter. The optical phase shifters 80 disposed on optical paths 110 may apply the corresponding optical phase shifts to optical local oscillator signal LO1 to generate phase shifted signals, which are then distributed to a respective optical combiner 116 for each antenna 30 in phased antenna array 88. For example, as shown in FIG. 8, a first optical phase shifter 80 may apply optical phase shift $\varphi_1$-1 to the optical local oscillator signal LO1 on the optical path 110-1 between optical splitter 108-1 and the optical combiner 116-1 for antenna 30-1 (thereby generating a phase shifted signal LO1+($\varphi_1$-1)), an Lth optical phase shifter 80 may apply optical phase shift $\varphi_L$-1 to the optical local oscillator signal LO1 on the optical path 110-L between optical splitter 108-1 and the optical combiner 116-1 for antenna 30-L (thereby generating a phase shifted signal LO1+($\varphi_L$-1)), etc. Similarly, a first optical phase shifter 80 may apply optical phase shift $\varphi_1$-2 to the optical local oscillator signal LO1 on the optical path 110-1 between optical splitter 108-2 and the optical combiner 116-2 for antenna 30-1 (thereby generating a phase shifted signal LO1+($\varphi_1$-2)), an Lth optical phase shifter 80 may apply optical phase shift $\varphi_L$-2 to the optical local oscillator signal LO1 on the optical path 110-L between optical splitter 108-2 and the optical combiner 116-2 for antenna 30-L (thereby generating a phase shifted signal LO1+($\varphi_L$-2)), etc.

Each optical combiner 116 may combine its received modulated optical signal LO2' with its received phase shifted signal to generate a combined (optical) signal and may illuminate the corresponding UTC PD 42 using the combined signal. For example, the optical combiner 116-1 for antenna 30-1 may illuminate the UTC PD 42-1 in antenna 30-1 using a combined signal that includes modulated optical local oscillator signal LO2'-1 and phase shifted signal LO1+($\varphi_1$-1), causing the UTC PD 42-1 in antenna 30-1 to generate a first antenna current I1 on antenna resonating element 36 (e.g., at the frequency of the THF signals, given by the difference between the frequency of optical local oscillator signals LO1 and LO2).

At the same time, the optical combiner 116-2 for antenna 30-1 may illuminate the UTC PD 42-2 in antenna 30-1 using a combined signal that includes modulated optical local oscillator signal LO2'-2 and phase shifted signal LO1+($\varphi_1$-2), causing the UTC PD 42-1 in antenna 30-1 to generate a second antenna current I2 on antenna resonating element 36 (e.g., at the frequency of the THF signals, given by the difference between the frequency of optical local oscillator signals LO1 and LO2). Since the modulation of modulated optical signal LO2'-1 is different from the modulation of modulated optical signal LO2'-2 (e.g., because wireless data stream DAT1 is different from wireless data stream DAT2), antenna current I1 is different from antenna current I2 (e.g., having different magnitudes and/or phases at the same point in time).

This process may be performed concurrently in each of the L antennas 30 of phased antenna array 88. For example, the optical combiner 116-1 for antenna 30-L may illuminate the UTC PD 42-1 in antenna 30-L using a combined signal that includes modulated optical local oscillator signal LO2'-1 and phase shifted signal LO1+($\varphi_L$-1), causing the UTC PD 42-1 in antenna 30-L to generate a first antenna current I1 on antenna resonating element 36. At the same time, the optical combiner 116-2 for antenna 30-L may illuminate the UTC PD 42-2 in antenna 30-L using a combined signal that includes modulated optical local oscillator signal LO2'-2 and phase shifted signal LO1+($\varphi_L$-2), causing the UTC PD 42-1 in antenna 30-L to generate a second antenna current I2 on antenna resonating element 36. Since the modulation of modulated optical signal LO2'-1 is different from the modulation of modulated optical signal LO2'-2 (e.g., because wireless data stream DAT1 is different from wireless data stream DAT2), the antenna current I1 on antenna 30-L is different from antenna current I2 on antenna 30-L (e.g., having different magnitudes and/or phases at the same point in time).

The antenna current I1 produced on the antenna resonating element 36 in each of the L antennas 30 across phased antenna array 88 may convey wireless data stream DAT1 (e.g., as produced by illumination of UTC PDs 42-1 using modulated optical signal LO2'-1). Antenna current I1 may cause antenna resonating elements 36 to transmit THY signals that convey first wireless data stream DAT1. The optical phase shifts $\varphi$-1 imparted to optical local oscillator signal LO1 by the optical phase shifters 80 coupled to optical splitter 108-1 may configure the transmitted signals across phased antenna array 88 to constructively and destructively interfere to produce a first signal beam 83-1 in a first beam pointing direction (e.g., in a first array response). By adjusting optical phase shifts $\varphi$-1, signal beam 83-1 may be adjusted to point in different directions.

Antenna current I1 and antenna current I2 are independently added together (via superposition) on antenna resonating elements 36. Superposition of photodiode output currents may help to avoid saturation of any individual UTC PD 42. The antenna current I2 produced on the antenna resonating element 36 in each of the L antennas 30 across phased antenna array 88 may convey wireless data stream DAT2 (e.g., as produced by illumination of UTC PDs 42-2 using modulated optical signal LO2'-2). Antenna current I2 may cause antenna resonating elements 36 to transmit THF signals that convey second wireless data stream DAT2. The optical phase shifts $\varphi$-2 imparted to optical local oscillator signal LO1 by the optical phase shifters 80 coupled to optical splitter 108-1 may configure the transmitted signals across phased antenna array 88 to constructively and destructively interfere to produce a second signal beam 83-2 in a second beam pointing direction (e.g., in a second array response). By adjusting optical phase shifts $\varphi$-2, signal beam 83-2 may be adjusted to point in different directions.

In this way, phased antenna array 88 may concurrently form first signal beam 83-1 that conveys first wireless data stream DAT1 and second signal beam 83-2 that conveys second wireless data stream DAT2. This process may be generalized to allow phased antenna array 88 to convey K wireless data streams in K different signal beams 83 oriented in K or fewer different spatial directions. Each set of optical phase shifters 80 coupled to each of the K optical splitters 108 may be adjusted to produce one of K different array responses for forming the K different signal beams. Optical phase shifters 80 may be plasmonic phase shifters or photonic phase if desired.

In implementations where wireless data streams DAT1 and DAT2 include wireless communication data, signal beam 83-1 may be used to transmit first wireless data stream DAT1 to a first external device at a first location while signal beam 83-2 is concurrently used to transmit wireless data stream DAT2 to a second external device at a second location (e.g., each signal beam may be oriented in a different spatial direction). This may be generalized to K signal beams that transmit K independent wireless data streams to K different devices at K different locations. If desired, signal beam 83-1 and signal beam 83-2 may be oriented in the same direction. In these situations, signal beams 83-1 and 83-2 may be used to concurrently transmit both wireless data streams DAT1 and DAT2 to the same external device (e.g., to boost the data rate of the external device relative to when a single stream is used). This may be generalized to directing K wireless data streams in K signal beams pointed to the same external device.

If desired, wireless data stream DAT1 may be the same as wireless data stream DAT2. In these examples, signal beam 83-1 may transmit the wireless data stream to a first external device at a first location while also transmitting the wireless data stream to a second external device at a second location (e.g., when wireless circuitry 24 broadcasts the same data to multiple external devices). If desired, one or more of the signal beams may be directed towards a reconfigurable intelligent surface that reflects the transmitted signals to an external device without a line of sight to device 10. This may be generalized to K wireless data streams and K signal beams. The K wireless data streams and K signal beams may be used to implement a multiple-input multiple-output (MIMO) scheme if desired.

If desired, the first array response of phased antenna array 88 (e.g., as produced by optical phase shifts $\varphi$-1) may be configured to produce a signal beam 83-1 having a signal null in the direction of the signal beam 83-2 produced by phased antenna array 88 (or vice versa). This may, for example, help to prevent interference between the two signal beams. This may be generalized to situations where there are K different signal beams concurrently produced by phased antenna array 88.

If desired, one or more of the signal beams may be used to transmit sensing signals (e.g., radio-frequency ranging and sensing signals such as radar signals). These signals may reflect off external objects, producing reflected signals received by device 10. Device 10 may process the transmitted and reflected signals to identify the range, position, and/or velocity of the external objects (e.g., to map the surroundings of device 10, to identify a user input gesture, to detect obstacles or hazards, to identify potential radio-frequency exposure events, etc.). If desired, one of the signal beams may transmit sensing signals while another of the signal beams concurrently transmits wireless communications data to an external device in an arrangement sometimes referred to herein as joint communication and sensing (JCAS). By configuring phased antenna array 88 to exhibit multiple concurrent array responses in this way, phased antenna array 88 may transmit wireless communication data to an external device in a first direction while concurrently performing radio-frequency sensing in a second direction that is different from the first direction.

If desired, each antenna 30 may include multiple UTC PD's that are illuminated with the same combined signal. For example, antenna 30-1 may include two or more UTC PD's 42-1 that are each illuminated by the optical combiner 116-1 for antenna 30-1. The two or more UTC PD's 42-1 may each produce antenna current I1 on antenna resonating element 36. Additionally or alternatively, antenna 30-1 may include two or more UTC PD's 42-2 that are each illuminated by the optical combiner 116-2 for antenna 30-1. The two or more UTC PD's 42-2 may each produce antenna current I2 on antenna resonating element 36. This may, for example, help to boost the power of antenna 30-1. This may be repeated across phased antenna array 88 if desired. Wireless circuitry 24 of FIG. 8 may additionally or alternatively be configured to receive THF signals carrying multiple streams of wireless data using multiple concurrent signal beams oriented in different directions. Antennas 30 of FIG. 8 may be configured to cover multiple polarizations (e.g., as shown in FIGS. 4 and 5).

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent with."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device comprising:
an antenna resonating element;
a first photodiode coupled to the antenna resonating element;
a second photodiode coupled to the antenna resonating element;
a first electro-optical modulator optically coupled to the first photodiode; and
a second electro-optical modulator optically coupled to the second photodiode.

2. The electronic device of claim 1, further comprising:
a light source;
a first optical phase shifter optically coupled between the light source and the first photodiode; and
a second optical phase shifter optically coupled between the light source and the second photodiode.

3. The electronic device of claim 2, further comprising:
a first optical combiner that optically couples the first electro-optical modulator and the first optical phase shifter to the first photodiode; and
a second optical combiner that optically couples the second electro-optical modulator and the second optical phase shifter to the second photodiode.

4. The electronic device of claim 3, further comprising:
a first optical splitter that optically couples the light source to the first optical phase shifter and the second optical phase shifter;
an additional light source; and
a second optical splitter that optically couples the additional light source to the first electro-optical modulator and the second electro-optical modulator.

5. The electronic device of claim 1, further comprising:
an additional antenna resonating element;
a third photodiode coupled to the additional antenna resonating element, the first electro-optical modulator being optically coupled to the third photodiode; and
a fourth photodiode coupled to the additional antenna resonating element, the second electro-optical modulator being optically coupled to the fourth photodiode.

6. The electronic device of claim 5, further comprising:
a first optical splitter that optically couples the first electro-optical modulator to the first photodiode and the third photodiode; and
a second optical splitter that optically couples the second electro-optical modulator to the second photodiode and the fourth photodiode.

7. The electronic device of claim 6, further comprising:
a light source;
a first optical phase shifter optically coupled between the light source and the first photodiode;
a second optical phase shifter optically coupled between the light source and the second photodiode;
a third optical phase shifter optically coupled between the light source and the third photodiode; and
a fourth optical phase shifter optically coupled between the light source and the fourth photodiode.

8. The electronic device of claim 7, further comprising:
a first optical combiner that optically couples the first optical splitter and the first optical phase shifter to the first photodiode;
a second optical combiner that optically couples the second optical splitter and the second optical phase shifter to the second photodiode;
a third optical combiner that optically couples the first optical splitter and the third optical phase shifter to the third photodiode; and
a fourth optical combiner that optically couples the second optical splitter and the fourth optical phase shifter to the fourth photodiode.

9. The electronic device of claim 8, wherein the first optical phase shifter and the third optical phase shifter are configured to control the antenna resonating element and the additional antenna resonating element to form a first signal beam oriented in a first direction, the second optical phase shifter and the fourth optical phase shifter being configured to control the antenna resonating element and the additional antenna resonating element to concurrently form a second signal beam oriented in a second direction.

10. The electronic device of claim 1, wherein:

the antenna resonating element comprises an antenna arm electrically coupled to both the first photodiode and the second photodiode, the electronic device further comprises a first optical path that optically couples the first electro-optical modulator to the first photodiode and a second optical path that optically couples the second electro-optical modulator to the second photodiode, the first electro-optical modulator is configured to transmit a first stream of wireless data conveyed by the antenna arm, and the second electro-optical modulator is configured to transmit a second stream of wireless data conveyed by the antenna arm concurrent with the first stream of wireless data.

11. The electronic device of claim 10, wherein the first photodiode comprises a first uni-travelling-carrier (UTC) photodiode, the second photodiode comprises a second UTC photodiode, and the antenna arm comprises a bowtie arm of a bowtie antenna.

12. An electronic device comprising:

a first antenna resonating element;

a first photodiode coupled to the first antenna resonating element and configured to produce, based on a first optical signal, a first current on the first antenna resonating element; and a second photodiode coupled to the first antenna resonating element, wherein the second photodiode is configured to produce, based on a second optical signal, a second current on the first antenna resonating element concurrent with the first photodiode producing the first current on the first antenna resonating element, the first current being different from the second current.

13. The electronic device of claim 12, further comprising:

a second antenna resonating element;

a third photodiode coupled to the second antenna resonating element and configured to produce, based on the first optical signal, a third current on the second antenna resonating element concurrent with the first photodiode producing the first current on the first antenna resonating element.

14. The electronic device of claim 13, further comprising:

a fourth photodiode coupled to the second antenna resonating element, wherein the fourth photodiode is configured to produce, based on the second optical signal, a fourth current on the second antenna resonating element concurrent with the third photodiode producing the third current on the second antenna resonating element.

15. The electronic device of claim 14, wherein the first antenna resonating element and the second antenna resonating element are configured to:

generate, based on the first current and the third current, a first signal beam oriented in a first direction, and generate, based on the second current and the fourth current, a second signal beam oriented in a second direction.

16. The electronic device of claim 15, wherein the first current, the third current, and the first signal beam are configured to convey a first wireless data stream, and the second current, the fourth current, and the second signal beam are configured to convey a second wireless data stream that is different from the first wireless data stream.

17. The electronic device of claim 15, wherein the first current, the third current, and the first signal beam are configured to convey a radio-frequency sensing signal.

18. The electronic device of claim 17, wherein the second current, the fourth current, and the second signal beam are configured to convey a wireless data stream, the second direction being different from the first direction.

19. An electronic device comprising:

a phased antenna array having a set of antennas, each antenna in the set of antennas having a respective antenna resonating element coupled to a respective plurality of photodiodes;

a light source configured to generate an optical signal;

a first electro-optical modulator configured to modulate a first wireless data stream onto the optical signal to generate a first modulated optical signal;

a second electro-optical modulator configured to modulate a second wireless data stream onto the optical signal to generate a second modulated optical signal; and optical paths configured to provide the first modulated optical signal to a first photodiode in each of the antennas in the set of antennas and configured to provide the second modulated optical signal to a second photodiode in each of the antennas in the set of antennas.

20. The electronic device of claim 19, further comprising:

an additional light source configured to generate an additional optical signal;

a first set of optical phase shifters configured to generate first phase shifted signals based on the additional optical signal;

a second set of optical phase shifters configured to generate second phase shifted signals based on the additional optical signal; and additional optical paths configured to provide a respective one of the first phase shifted signals to the first photodiode in each of the antennas in the set of antennas and configured to provide a respective one of the second phase shifted signals to the second photodiode in each of the antennas in the set of antennas.

* * * * *